(12) United States Patent
Vancina

(10) Patent No.: US 8,911,596 B2
(45) Date of Patent: Dec. 16, 2014

(54) METHOD AND APPARATUS FOR PLASMA DECOMPOSITION OF METHANE AND OTHER HYDROCARBONS

(71) Applicant: Hope Cell Technologies Pty Ltd, Patterson Lakes, Victoria (AU)

(72) Inventor: Robert Vancina, Patterson Lakes (AU)

(73) Assignee: Hope Cell Technologies Pty Ltd, Patterson Lakes, Victoria (AU)

( * ) Notice: Subject to any disclaimer, the term of this patent is extended or adjusted under 35 U.S.C. 154(b) by 179 days.

(21) Appl. No.: 13/769,405

(22) Filed: Feb. 18, 2013

(65) Prior Publication Data

US 2013/0153403 A1 Jun. 20, 2013

Related U.S. Application Data

(63) Continuation-in-part of application No. PCT/AU2010/001076, filed on Aug. 23, 2010, and a continuation-in-part of application No. 12/992,928, filed as application No. PCT/AU2008/000693 on May 16, 2008, now Pat. No. 8,409,422.

(30) Foreign Application Priority Data

May 18, 2007 (AU) .............................. 2007902688

(51) Int. Cl.
- *B29C 59/10* (2006.01)
- *C01B 3/24* (2006.01)

(52) U.S. Cl.
CPC ........... *C01B 3/24* (2013.01); *C01B 2203/0272* (2013.01); *C01B 2203/0861* (2013.01); *C01B 2203/1241* (2013.01)
USPC ........... 204/168; 204/156; 204/164; 422/186; 422/186.03; 422/186.04

(58) Field of Classification Search
CPC .............. C01B 3/24; C01B 2203/1241; C01B 2203/0861; C01B 2203/0272; B01J 19/08
USPC ............. 204/156, 164, 168; 422/186, 186.03, 422/186.04
See application file for complete search history.

(56) References Cited

U.S. PATENT DOCUMENTS

| | | |
|---|---|---|
| 3,121,031 A | 2/1964 | Grüneberg et al. |
| 3,410,770 A | 11/1968 | Buechler |

(Continued)

FOREIGN PATENT DOCUMENTS

| | | |
|---|---|---|
| KR | 10-2008-0054600 | 6/2008 |
| RU | 2349545 C2 | 3/2009 |
| WO | WO 2007/012149 A1 | 2/2007 |

OTHER PUBLICATIONS

USPTO Non-Final Office Action issued in U.S. Appl. No. 13/778,290 dated May 21, 2014.
Crillo et al., "Transmutation of metal at low energy in a confined plasma in water," Eleventh International Conference on Condensed Matter Nuclear Science, 2004, Marseille, France.

(Continued)

*Primary Examiner* — Xiuyu Tai
(74) *Attorney, Agent, or Firm* — RatnerPrestia

(57) ABSTRACT

This invention relates to a process and an apparatus for generating hydrogen and synthetic carbon-free gas by plasma reforming-decomposing of Methane and other hydrocarbons for producing hydrogen and synthetic carbon-free gas through plasma discharge in hydrogen medium. The process involves applying an electrical potential between the electrodes while immersed in hydrogen medium. The plasma ionizes the medium, thereby generating hydrogen and synthetic gas by decomposing of hydrogen medium. The process further involves controlling the process by relocating the generated plasma between two or more further electrodes.

15 Claims, 2 Drawing Sheets

(56) References Cited

U.S. PATENT DOCUMENTS

| | | |
|---|---|---|
| 5,240,572 A | 8/1993 | Turner et al. |
| 5,486,674 A | 1/1996 | Lynum et al. |
| 5,997,837 A | 12/1999 | Lynum et al. |
| 2003/0221949 A1 | 12/2003 | Rabinovich et al. |
| 2004/0045808 A1 | 3/2004 | Fabry et al. |
| 2004/0195089 A1 | 10/2004 | O'Brien |
| 2004/0238349 A1 | 12/2004 | Greathouse et al. |
| 2006/0233699 A1 | 10/2006 | Mills |
| 2007/0284244 A1 | 12/2007 | Davidson |
| 2009/0196804 A1 | 8/2009 | Masuda et al. |

OTHER PUBLICATIONS

Mizuno et al., "Confirmation of anomalous hydrogen generation by plasma electrolysis," $4^{th}$ Meeting of Japan CF Research Society, 2003, Iwate, Japan.

International Search Report for PCT Application No. PCT/AU2008/000693, mailed Jul. 4, 2008.

International Preliminary Report on Patentability with Written Opinion for PCT Application No. PCT/AU2008/000693 issued Nov. 17, 2010.

International Search Report for PCT Application No. PCT/AU2010/001076 mailed Oct. 8, 2010.

USPTO Non-Final Office Action issued in U.S. Appl. No. 13/778,290 dated Sep. 19, 2014.

METHOD AND APPARATUS FOR PLASMA DECOMPOSITION OF METHANE AND OTHER HYDROCARBONS

CROSS REFERENCE TO RELATED APPLICATIONS

This application is a Continuation-in-Part of PCT International Application No. PCT/AU2010/001076, filed Aug. 23, 2010 which claims priority to Australian Patent Application Nos. 2009904061, filed Aug. 25, 2009 and 2009905592, filed Nov. 13, 2009; and a Continuation-in-Part of U.S. patent application Ser. No. 12/992,928, filed Dec. 29, 2010, which is the U.S. National Phase Application of PCT International Application No. PCT/AU2008/000693, filed May 16, 2008 which claims priority to Australian Patent Application No. 2007902688, filed May 18, 2007, the contents of such applications being incorporated by reference herein.

FIELD OF THE INVENTION

The present invention relates to plasma decomposition of methane and other hydrocarbons for producing hydrogen and synthetic carbon-free gas through plasma reforming process

BACKGROUND OF THE INVENTION

Hydrocarbon fuels are the most commonly used as energy sources. Each molecule of those fuels contains hydrogen and carbon as the major components. Other elements or molecules in those fuels depend of the fuel type—from simplest methane or propane gases to more complicated molecules of crude oil.

Fossil fuels developed over geological time represent the world's energy capital. Many renewable forms of energy-those derived from wind, solar or marine (tidal, wave) sources, must be used as they are produced; otherwise they are wasted. Other renewable energy may have some energy storage potential such as: hydro energy is contained in potential energy of stored water in lakes or rivers and geothermal energy is retained underground until required.

Decarbonization of economies is occurring as the shift is progressively made from using coal to using oil and, most recently, to natural gas, i.e. to hydrocarbons containing less carbon. This shift follows technology progress on energy efficiency and lower scale polluting solutions in rising demand for energy. Hydrocarbons are predominantly used in thermodynamic conversion of energy.

Hydrogen as a component of hydrocarbon fuel is a major carrier and source of energy. It has universal usage as the source such as thermodynamic in combustion, electric conversion in fuel cells, nuclear in fission and lately developing possibility for fusion experiments.

The use of hydrogen as a fuel has many advantages in front of other solutions. Hydrogen is the most efficient when it comes to conversion to useful energy forms such as thermal; mechanical and electrical. Hydrogen is some 39% more efficient than fossil fuels, without the pollution. It can be considered as the most effective energy storage in any scale. When fire hazards and toxicity are taken in to account, hydrogen is the safest due to highest buoyancy—evaporation of all gases and being base of most of biological matter.

In the present and future sources of hydrogen, hydrocarbons decomposition will play a major role as the commonly accepted source and storage of $H_2$ hydrogen and other synthetic carbon-free gases. Major consumption of hydrogen so far has been in the petroleum industry for the refining and upgrading of crude petroleum and in chemical industry for the manufacture of fertilizers, methanol and a variety of organic chemicals.

Other important uses are in the food industry for the hydrogenation of edible plant oils to fats and in the plastic industry for making various polymers. Applications such as in metal, electronics, glass, electric power and space industry are also present.

There are many obstacles towards wide usage of hydrogen as the universal source of energy which can be classified as institutional, technical, regulatory and financial.

Some of difficulties comprise of barriers associated with the production, distribution and utilization of hydrogen—starting from coal and lower grade fossil fuels with capture and storage of the carbon released as the carbon dioxide, the problems of producing hydrogen efficiently and affordably using clean technology, the requirement for substantial amounts of capital, including risk capital to establish a hydrogen infrastructure; the need to reduce production cost to compete with traditional fuels, need to be adoptable to existing technological solutions, lack of international consistent codes and standards to ensure hydrogen safety and facilitation of its commercialization.

One of the main problems associated with hydrogen production in hydrocarbon conversion process from chemical point of view, is kinetic limitation. Low feasibility narrowing options of process for conventional thermal conversion, with high energy consumption, using special high-priced catalysts to attain reasonably high specific productivity and equivalent equipment size without much scalability rate.

However, in any case, large equipment size and metal capacity characterize this technology. The necessity to heat the catalyst to the high working temperature leads also to the problem of 'cold start' restricting mobile applications.

Hydrogen basic physical properties ensure future wide usage as an energy source and carrier of high caloric value. Wide variety of applications can be adapted to hydrogen use as the source or medium of energy.

Hydrogen is very reactive element and does not exist in elementary form in natural environment of the Earth. It always comes in molecular arrangement of clusters. Stability of those clusters depends of stability of all elements included. Hydrogen is bonded with other elements not only as single molecule bond but rather as oscillating clusters of molecules bonded together.

The substantial cooperative strengthening of the hydrogen bond is dependent on long range interactions and strength of each bond in the cluster encourages larger clusters formation for the same average bond density and potential.

In hydrocarbon arrangement carbon release can be achieved by exposing clusters to high temperatures. Unstable hydrogen in a cluster, which bond with carbon has been broken when exposed to high temperatures, will tend to react with predominantly electrically opposite element in its proximity. In a vacuum environment it will form hydrogen molecule cluster $H_2$.

Breaking one bond through exposing hydrocarbon to heat generally weakens those around. If exposed to the oxygen environment, exposed hydrogen will violently react in combining with oxygen through combustion. Exothermic reaction further breaks the hydrogen-carbon bond in hydrocarbon and exposes more hydrogen to run off combustion process.

Different hydrocarbon bonds occur in various lengths and structures and comprise various additional elements as well. More complex hydrocarbon cluster can be broken to as many simple hydrocarbons and other components through exposing to different temperatures.

Plasma can essentially improve situation. Plasma is a high-density source of energy, which can cover process enthalpy and provide optimal temperature range to eliminate kinetic limitations. Hydrocarbon decomposition through plasma discharge demonstrates a high specific productivity of decomposition rate comparing with steam reforming or partial oxidation processes.

SUMMARY OF THE DISCLOSURE

An aspect of the invention is an improved apparatus and method for providing stable and controllable plasma for the purpose of generating hydrogen via plasma decomposition of hydrocarbon materials.

Employing plasma, through proposed method and apparatus, as medium for changing state of the matter of the hydrocarbon enclosed in the vacuum, change physical properties of the cluster. Plasma electrical charge ionizes hydrocarbons and enables lower temperatures of hydrocarbon decomposition through resonating bonds in the cluster with a highly energetic rate and resulting in more effective breakage of hydrogen-carbon bond.

This approach gives a number of advantages: lower energy consumption, higher energy efficiency in production, starting and stopping the decomposition process is close to instantaneous, user friendly control with possibility of instant variable output of the process, scalability of application, decomposition approaching 100% under optimal high pressure, low electrical conductivity of input hydrocarbon gas can be converted through plasma discharge in to high conductivity physical properties.

A wide variety of hydrocarbon compounds can be used in plasma decomposition according to this invention where carbon, as the by-product is released in solid soot state and is easily removable and ready for usage in different applications or safe storage. Important characteristics of the process are simplification of the decomposition, no need for catalyst so no catalyst deactivation, scalable size, on demand usage, mobile equipment friendly and low cost applications.

Under plasma set up conditions, it is believed that hydrogen gas is generated at a cathode with much of the space between the cathode and an ion charge screen layer being formed as double layer. Ions of hydrogen migrate through the screen to discharge on the cathode and produce hydrogen gas.

Increasing the applied voltage above 80V has the effect of significantly increasing hydrogen gas production to the point that the space between the cathode and the ion charged screen layers becomes filled with hydrogen gas. The hydrocarbon gas has low electrical conductivity, so the electrical resistance increases until unstable bursts of plasma form to discharge the potential difference between the cathode and the ion screen. The high localized voltage can result in spot temperatures greater than 3000° C. Such heating results in instant decarbonization on a wide scale of hydrocarbons.

An aspect of the invention provides a process for producing hydrogen from hydrocarbon material by plasma treatment, the process comprising:
(a) supplying hydrocarbon material in a fluid form to a plasma treatment cell having an anode and a cathode and further electrodes disposed in a volume in the cell;
(b) initiating plasma between the anode and the cathode by applying a first electrical potential between the anode and cathode, thereby decomposing part of the hydrocarbon material through plasma discharge and generating hydrogen gas and carbon soot;
(c) controlling the process by relocating the generated plasma between the further electrodes and the anode.

The applicant believes that overheating of the plasma generating electrode in continuous operation can be avoided by spatially distributing the plasma around the enclosure of the decomposing cell. Specifically, the applicant believes that localization of the plasma bursts at the plasma electrodes in discharge initiation can cause intense heating and the screen double layers of ions adjacent the cathode is disrupted. As a result, plasma generating conditions are lost and the pyrolysis process no longer operates on the basis of plasma discharge until the plasma generating electrodes operate on the temperature sufficient to form a ion charged screen layers.

The applicant believes that plasma generated at the electrodes can be stabilized, rather than occurring in short bursts, by controlling the location of the plasma with electrical and magnetic fields. As a result, the structure of the ion screen layers surrounding the cathode is maintained with largely hydrogen gas filling the gap between the cathode and the ion screen layers. Hydrogen ions continue to migrate through the screen to form hydrogen gas and plasma is constantly initiated at the cathode for stabilization on the further electrodes. Ions and other components of the hydrocarbon migrate to the anode and form carbon soot and additional impurities removed in further processes.

Plasma can be initiated and maintained through capacitive discharge between electrodes, laser breakage of dielectric gas and maintained through lower voltage capacitive discharge or magnetron or radio frequency applied pulses.

The relocated plasma is maintained between the further electrodes without an ion screen layers and, therefore, without a dielectric surrounding the electrodes. Nevertheless, the hydrocarbon material treated by plasma are ionized and the ions produce carbon soot, other impurities found in particular hydrocarbons and hydrogen or synthetic carbon-free gas at respective electrodes.

The location of the plasma may be controlled by applying a second electrical potential between each further electrode and the anode.

The location of the plasma may also be controlled by magnetic fields and, preferably, the magnetic fields are produced by permanent magnets.

Preferably the cathode comprises the cell body in contact with the ion screen layers and the anode comprises a metal and is electrically isolated from the cathode.

By forming the cathode as a body of a decomposing cell, the plasma generated between the cathode and anode is encouraged to spatially disperse away from the points of closest geometrical proximity between the anode and the cathode, thereby assisting to spatially distribute the plasma around the decomposing cell.

The first electrical potential may be in the range of 120 to 400 volts, but preferably is 160 to 380 volts with capacitor bank of 60 to 160 µF.

The further electrodes may be located in close proximity to the cathode so the second electrical potential applied to the two or more further electrodes encourages plasma generated between the cathode and the anode to transfer to between the further electrodes and the anode.

Preferably, step (c) involves applying a second electrical potential to the further electrodes in contact with the ion screen layers and in close proximity to the first electrodes, the second electrical potential generating an electrical field to cause plasma generated between the cathode and the anode to transfer from the cathode to two or further electrodes to stabilize the plasma.

The second electrical potential 40 to 200 volts and, more preferably, is 55 to 100 volts.

The process may further involve removing oxygen-containing gas from the plasma treatment cell prior to step (a). This may be achieved by purging with an inert gas, or with the hydrocarbon fluid or by applying a vacuum to the cell.

Another aspect of the invention is an apparatus for producing hydrogen gas from hydrocarbon material comprising:
(a) a cell defining a volume for containing an hydrocarbon material, the cell comprising an electrically conductive material;
(b) hydrocarbon material input means for supplying the hydrocarbon material to the volume and required pressure;
(c) gas collection means for conveying hydrogen gas and other decomposed elements away from the cell;
(d) one or more cathodes positioned within the cell for immersion within hydrocarbon contained within the cell and for fast switching initiation plasma;
(e) further electrodes positioned within the cell for immersion within the hydrocarbon material and for generating an electrical field within the cell to relocate plasma generated at the or each cathode away from the or each cathode, each further electrode being electrically isolated from the cathode.

The further electrodes may define a planar surface area for spatially distributing plasma between the surface area and the cell.

The further electrodes may include an array of apertures for increasing the surface area of the electrode to enhance spatial distribution of plasma.

The cell may comprise an anode for forming plasma in conjunction with the cathode, the cathode being electrically isolated from the cell.

The apparatus may include a hydrocarbon material flow member for reducing the effect of turbulence caused by moving around the further electrodes and pre-heating.

The hydrocarbon material flow member may define a first channel within the cell for enabling temperature directing of hydrocarbon material when passing through the plasma when contained within the cell.

The hydrocarbon material flow member may be formed as a sleeve for location within the cell volume between the further electrodes and adjacent cell wall, the sleeve may be open at one end and define a volume between the ends that comprises the channel and defines the second channel between the sleeve and the adjacent cell wall such that hydrocarbon material is able to flow from the channel around an end of the sleeve and into the plasma filled area.

The sleeve may be formed from magnetically conductive material and, in situ within the cell, is connected to the cell.

The hydrocarbon material is a gas and/or liquid containing hydrocarbons. The hydrocarbon material may be natural gas, methane, propane, butane or a refined oil product.

BRIEF DESCRIPTION OF THE DRAWINGS

An embodiment of the invention will now be described, by way of example only, with reference to the accompanying drawings, in which.

DETAILED DESCRIPTION OF AN EMBODIMENT

Figure 1:
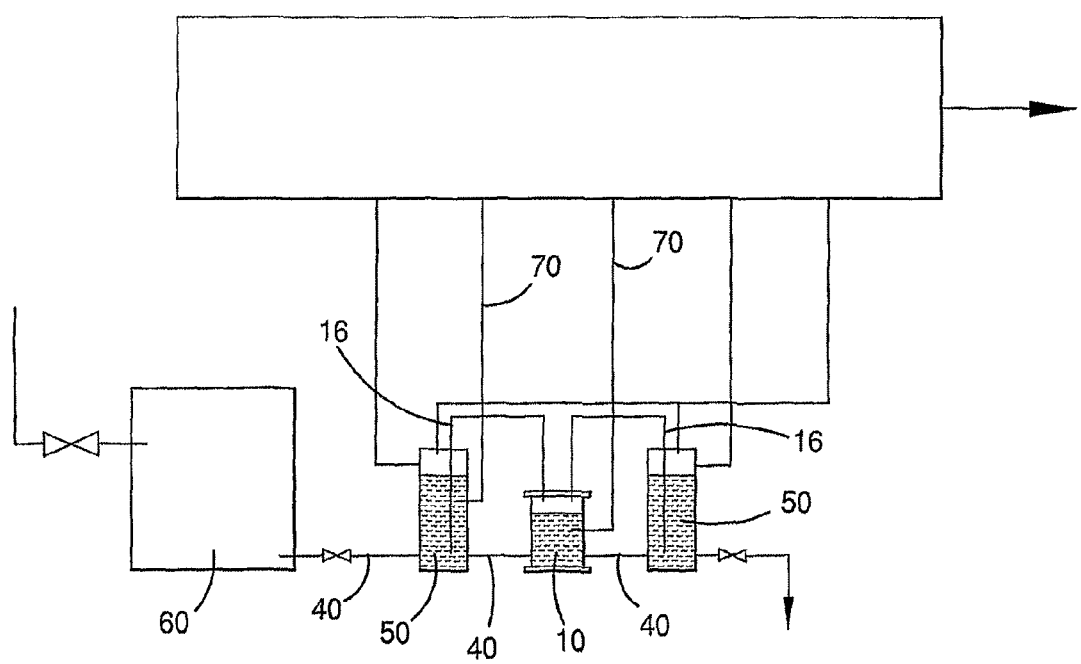
FIG. 1 is a schematic diagram of an apparatus in accordance with an embodiment of the invention.

A hydrocarbon material decomposition process in accordance with an embodiment of the present invention may be performed with an apparatus in accordance with an embodiment illustrated in FIG. 1.

The apparatus comprises an hydrocarbon decomposing cell 100 linked to gas separators 50 by conduits 40 and off-gas lines 16. The separators 50 are linked to a reservoir 60 by a further conduit 40 to ensure that the separators remain filled. Thermocouples and pressure sensors 70 are located respectively in the cell 100 and in a separator 50 to monitor the temperature and pressure of the process. Although not shown in FIG. 1, two separate power sources provide electrical energy for the hydrocarbon decomposition process.

The cell 100 comprises two stacked upper and lower parts 111A and 111B. Each part 111A and 111B has a cylindrical body 112 with outwardly extending end flanges 114 at each end of the body 112. The parts 111A and 111B are formed of stainless steel 316 L.

The stacked parts 111A and 111B are fastened together to form a substantially continuous cylindrical volume within the cylindrical bodies 112. Respective ends of the parts 111A and 111B are closed by covers 113 such that the volume is fluid-tight. To form an appropriate seal, a disc 115 of virgin Teflon®, having the same diameter as the flanges 114, is disposed between the covers 113 and the flanges 114.

As with the embodiment described above, the cell 10 is formed of electrically conductive material to form an electrode. A plasma electrode 120 extends into a volume defined by the cylindrical body 112 through the cover 113. The plasma electrode 120 is electrically isolated from the cover 113 by an isolator 122 to prevent short circuiting between the cell 10 and the plasma electrode 120.

Plasma relocating electrodes are provided in the form of plasma relocating cathodes 130 and plasma relocating anodes 132 and are formed of STAVAX® stainless steel with magnetic properties. One or more cathodes 130 and one or more anodes 132 may be alternately supported along two generally parallel support rods 140. The support rods 140 are electrically conductive and the cathodes 130 are electrically connected to one of the support rods 140, but electrically isolated from the other support rod 140. Similarly, the anodes 132 are electrically connected to the other support rod 140, but electrically isolated from the support rod 140 to which the cathodes 130 are electrically connected by insulating mounts that comprise respective silicone gaskets and O-rings.

The plasma relocating cathodes 130 and anodes 132 are generally disc-shaped to fill a substantial cross-sectional area of the cylindrical body 112. However, the plasma relocating cathode 130 in closest proximity to plasma initiating anode electrode 120 is formed with hole, approximately 4 millimeters in diameter, adjacent to the plasma initiating anode 120.

With each plasma relocating cathode 130 and plasma relocating anode 132 is associated a permanent magnet 138 having the shape of an annulus.

This configuration of plasma initiating anode 120, plasma relocating cathode 130 and plasma relocating anode 132 and permanent magnets 138 ensures that the electrical field generated by the cathodes 130 and the anodes 132 and the magnetic field generated by the permanent magnets 138 causes relocation of plasma from the plasma initiation electrode 120 to the plasma relocating electrodes 130, 132.

The cell 100 includes a conductive sleeve 142 that is positioned in a lower part 111B between the plasma relocating anodes and cathodes 130 and 132 and the cell body 112. The sleeve 142 has a cylindrical form with top end attached to body 111B forming part of body and, at bottom end, four tabs 144 that project outwardly from the sleeve 142. The tabs 144 are located at 90 degree intervals around the rim of the sleeve 142 and diverge outwardly from the sleeve 142 such that the distance between free ends of opposed tabs 144 is slightly greater than the inner diameter of the cell body 112.

During operation of the cell 100, the sleeve 142 acts as an electrode; it forms a path for magnetic flux with anodes and cathodes 130 and 132 and mounted permanent magnets 138, such that plasma extends between the sleeve 142 and the anodes and cathodes 130 and 132.

Significant quantities of hydrogen gas are produced in the course of operating the cell. The decomposed hydrogen manifests as gas mixed with carbon soot that rise from the anodes and cathodes 130 and 132 and require further cooling and filtering through wet and dry filtration outside the cell.

To reduce the effect of turbulence, and the mean of pre-heat with partial decomposing, the sleeve 142 aids circulation of hydrocarbon material within the cell 100. Specifically, hydrocarbon circulation through the volume defined by the sleeve 142, force moving hydrocarbon downwardly in a channel 146 between the sleeve 142 and the cell body 112 and around the lower rim 148 of the sleeve 142 and back upwardly through the sleeve 142 volume.

A top cover (not shown) of the cell 10 includes two apertures to which off-gas conduit lines 16 are connected for removing hydrogen gas and carbon soot mixture from the cell. The off-gas conduit lines 16 extend respectively into the separators 50 so that the cell off-gas bubbles through a liquid solution contained within the separators 50.

After removing oxygen-containing gas from the cell 100, the cell 10 is filled with hydrocarbon, initially, plasma discharge is performed by applying an electrical potential between the electrodes 160 and 380V and is supported by capacitor bank. The electrical potential is applied by a typical power supply with a MOSFET transistor control such that an electrical potential of 50 to 400V DC.

Figure 2:
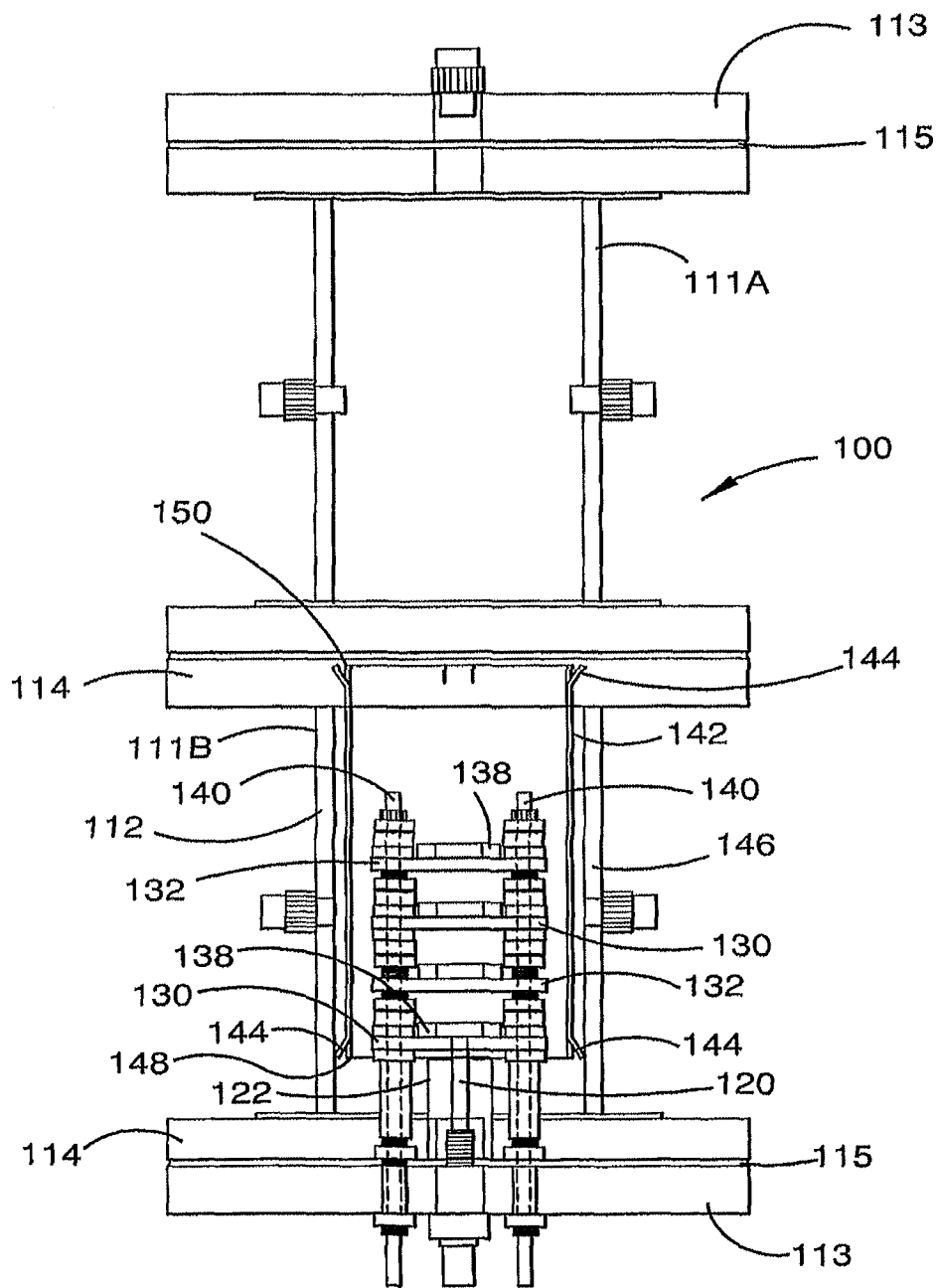
FIG. 2 is a schematic isometric view of an embodiment of a plasma hydrocarbon decomposing cell for use with the apparatus of FIG. 1.

It will be appreciated that the current supplied to the apparatus will vary depending on the scale of the apparatus. By way of example, the current applied to the apparatus shown in FIGS. 1 and 2 may range from 40 to 200 A. Preferably, the current is 50 to 85 A.

Direct electrical potential is applied between the plasma electrodes 120 and the cell body 112. An electrical potential in the range 120 to 400V may be applied, but an electrical potential in the range 160 to 380V is suitable to initiate plasma formation. The charge application of an electrical potential to the plasma electrodes 120 and the cell body 112 continues and increases the amount of hydrogen gas and carbon soot mixture generated. Hydrogen ions are formed and migrate to the cell body 112, and C-ions migrate to the electrode 120.

This ionic flux allows current to pass through the hydrocarbon material and produces hydrogen at the plasma discharge surface. This mechanism is characterized by low activation energy and high reaction rate. Non-equilibrium plasma is obtained in arc discharges via fast mixing of plasma jet and reactants in the high temperature zone of discharge. Proposed mechanism of the plasma effect on $CH_4$ decomposition follows—thermal acceleration related with local preheating on to entry of the hydrocarbon material in the cell through channel 146 between body 112 and sleeve 142 cause radical acceleration.

Passing through heated part of channel and entering plasma hot discharge area, thermal acceleration is provided and directly related to local overheating into ions $CH_3$, H, $CH_2$ generated by plasma from supply gas, autocatalytic methane decomposition on the surface of carbon soot particles generated in plasma zone, ion acceleration caused by ion-molecular chain reaction of methane decomposition.

During chemical reaction, gas temperature decreases, indicating non-thermal character of the plasma effect. This mechanism can be described as: initiation $CH_4+e=CH_3^++H$; cluster growth reactions $CH_3^++CH_4=C_2H_5^++H_2$, $C_nH_{2n+1}^++CH_4=C_{n+1}H_{2n+5}^+$, $C_{n+1}H_{2n+5}^+=C_{n+1}H_{2n+3}^++H_2$, and chain termination $C_nH_{2n}+H$ ion-molecular mechanism characterized by low activation energy and high reaction rate.

The overall cathode reaction is strongly enhanced by the hydrogen ions $H^+$. Accordingly, the cathode reaction will last until all the hydrogen disappears from the solution. Simultaneously, the carbon will collect around the electrode, without depositing on it, to form a sleeve or screen with a negative potential that holds itself few nanometers from the surface of the plasma electrode. In this situation, the space between the screen of carbon ions and the plasma electrode becomes filled with $H^+$ and $H_2^+$ which acts as a dielectric. In spite of this screen of carbon ions, ions of hydrogen, being much smaller, will continue to work through the screen of carbon ions without difficulty to move towards and deposit on the plasma cathode 112 and generate gaseous hydrogen.

As discharge proceeds, the amount of the hydrogen generation increases significantly, so much that it blocks further hydrogen ions from reaching the plasma electrode 112. As a result, there is a dielectric breakdown between the plasma electrode 120 and the carbon ion screen due to a sufficiently high resistance in the gaseous space separating the plasma electrodes 120 and the carbon ion screen that causes plasma formation. The plasma causes the potential to drop locally as the electrical current in the plasma bridges the space between the plasma electrode 120 and the carbon ion screen.

The plasma is stabilized by applying an electrical field that attracts plasma away from the plasma initiating electrode 120. The electrical field is applied by applying an electrical potential to the plasma relocating electrodes 130 and 132, e.g. 12 to 300V DC. Although the potential is applied between the plasma relocating electrodes, a larger potential is created between each plasma relocating electrode 130 and 132 and the cell body 112.

As a result, plasma, which tends to follow the physical curve of the magnetic flux and generated electrical charge in hydrocarbon, is strongly attracted to nearby charges allowing a new plasma path to be formed. The new path relocates and scatters the plasma from between the plasma electrodes 120 and the cell body 112 to between the plasma relocating electrodes 130 and 132 and the cell body 112. The plasma is spatially distributed through a many times greater volume of the cell 100, thereby forming a bigger decomposition effect of passing through hydrocarbon material.

By relocating the plasma, melting of the plasma electrodes 120 is avoided, thus preserving the plasma electrode 120 for a longer working life.

Control of plasma and output of generated gases is achieved through varying the current applied to the plasma relocating electrodes 130 and 132.

Temperature fluctuations in the cell 100 are stabilized by managing the volume (pressure) of surrounding hydrocarbon. This volume of solution also assists to maintain a stable cell 100 temperatures by circulating solution through the cell 100 and applied current of plasma relocating electrodes.

Associated equipment is electrically isolated from the cell 100 and the ground connection is protected by a metal enclosure in which the apparatus is installed.

Reference to any prior art in the specification is not, and should not be taken as, an acknowledgment or any form of suggestion that this prior art forms part of the common general knowledge in Australia or any other country.

Many modifications may be made to the preferred embodiment of the present invention as described above without departing from the spirit and scope of the present invention.

It will be understood that the term "comprises" or its grammatical variants as used in this specification and claims is equivalent to the term "includes" and is not to be taken as excluding the presence of other features or elements.

The invention claimed is:

1. A process for producing hydrogen from hydrocarbon material by plasma treatment, the process comprising:
   (a) supplying hydrocarbon material in a fluid form to a plasma treatment cell having an anode and a cathode and further electrodes disposed in a volume in the cell;
   (b) generating plasma between the anode and the cathode positioned in the hydrocarbon material by applying a first electrical potential between the anode and cathode, thereby decomposing part of the hydrocarbon material through plasma discharge and generating hydrogen gas and carbon soot; and
   (c) relocating the generated plasma between the further electrodes and the anode.

2. The process according to claim 1, wherein the location of the plasma is controlled by applying a second electrical potential between each further electrode and the anode.

3. The process according to claim 2, wherein the further electrodes are located in close proximity to the cathode so the second electrical potential applied to the further electrodes encourages plasma generated between the cathode and the anode to transfer to between the further electrodes and the cathode.

4. The process according to claim 3, wherein the first electrical potential is 120 to 400 volts and the second electrical potential is 12 to 200 volts and the process can be assembled as multiphase arrangement.

5. The process according to claim 1, wherein the location of the plasma is controlled by magnetic fields.

6. The process according to claim 5, wherein the magnetic fields are produced by permanent magnets.

7. The process according to claim 1, wherein the hydrocarbon material comprises gas and/or liquid containing hydrocarbons.

8. The process according to claim 7, wherein the hydrocarbon decomposition is performed in a vacuum.

9. The process according to claim 1, wherein the cathode comprises the cell body in contact with the hydrocarbon and the anode comprises a metal and is electrically isolated from the cell body.

10. The process according to claim 1, wherein the process includes a further step before step (b) of heating the hydrocarbon material between two further electrodes electrically isolated from the anode and immersed within the hydrocarbon material.

11. The process according to claim 10, wherein the heating step heats the hydrocarbon material to a temperature of 50 to 400° C. and decomposing hydrogen medium.

12. The process according to claim 10, wherein the first electrical potential is applied after the hydrocarbon material is heated.

13. The process according to claim 1, further comprising removing oxygen-containing gas from the cell prior to step (a).

14. The process according to claim 13, wherein the oxygen-containing gas is removed by purging the cell with inert gas or hydrocarbon material or by applying a vacuum to the cell.

15. The process according to claim 1, wherein plasma generation is initiated by capacitive discharge, magnetron operation or by radio frequency or laser discharge.

* * * * *

UNITED STATES PATENT AND TRADEMARK OFFICE
CERTIFICATE OF CORRECTION

| | | |
|---|---|---|
| PATENT NO. | : 8,911,596 B2 | Page 1 of 1 |
| APPLICATION NO. | : 13/769405 | |
| DATED | : December 16, 2014 | |
| INVENTOR(S) | : Robert Vancina | |

It is certified that error appears in the above-identified patent and that said Letters Patent is hereby corrected as shown below:

On the Title Page, Item [30], Foreign Application Priority Data, insert --Aug. 25, 2009 (AU) 2009904061-- and --Nov 13, 2009 (AU) 2009905592--

Signed and Sealed this
Seventeenth Day of March, 2015

Michelle K. Lee
*Director of the United States Patent and Trademark Office*